(12) United States Patent
Abbasi et al.

(10) Patent No.: US 6,454,821 B1
(45) Date of Patent: Sep. 24, 2002

(54) POLISHING COMPOSITION AND METHOD

(75) Inventors: Faraz Abbasi, Indianapolis, IN (US); Phil O, Greenwood, IN (US); James Kent Knapp, Pittsboro, IN (US); Lei Liu, Carmel, IN (US)

(73) Assignee: Praxair S. T. Technology, Inc., North Haven, CT (US)

( * ) Notice: Subject to any disclaimer, the term of this patent is extended or adjusted under 35 U.S.C. 154(b) by 0 days.

(21) Appl. No.: 09/598,161

(22) Filed: Jun. 21, 2000

(51) Int. Cl.⁷ .............................. C09K 3/14; C09G 1/02
(52) U.S. Cl. ................... 51/309; 51/307; 106/3
(58) Field of Search .................. 51/307, 309; 106/3; 438/692, 693

(56) References Cited

U.S. PATENT DOCUMENTS

| | | | |
|---|---|---|---|
| 3,429,080 A | * 2/1969 | Lachapelle .................. 51/309 |
| 4,601,755 A | 7/1986 | Melard et al. ................. 106/3 |
| 4,769,073 A | 9/1988 | Tastu et al. .................... 106/3 |
| 4,786,325 A | 11/1988 | Melard et al. ................. 106/3 |
| 4,842,619 A | 6/1989 | Fritz et al. .................... 51/295 |
| 5,087,481 A | 2/1992 | Chen et al. .................. 427/129 |
| 5,226,955 A | 7/1993 | Owaki ............................ 106/3 |
| 5,800,577 A | * 9/1998 | Kido et al. .................... 51/307 |
| 5,840,629 A | * 11/1998 | Carpio ........................ 51/309 |
| 5,858,813 A | * 1/1999 | Scherber et al. .............. 51/307 |
| 6,117,220 A | * 9/2000 | Kodama et al. ............... 106/3 |
| 6,319,096 B1 | * 11/2001 | Mueller et al. ............... 51/309 |

OTHER PUBLICATIONS

Cook, "Chemical Processes in Glass Polishing", Elsevier Science Publishers B.V. (North-Holland) (1990) pp 152–171 (no month).

* cited by examiner

Primary Examiner—Michael Marcheschi
(74) Attorney, Agent, or Firm—Blake T. Biederman

(57) ABSTRACT

The polishing slurry includes by weight percent, 0.1 to 50 metal oxy-acid accelerator, 0.5 to 50 cerium oxide abrasive particles and balance water. The metal oxy-acid accelerator is formed with a metal selected from the group consisting of chromium, lanthanum and rare earth metals 59 to 71, manganese, molybdenum, niobium, osmium, rhenium, ruthenium, titanium, tungsten, vanadium, yttrium and zirconium.

7 Claims, 2 Drawing Sheets

POLISHING COMPOSITION AND METHOD

FIELD OF THE INVENTION

This invention relates to the field of polishing slurries.

BACKGROUND OF THE INVENTION

In an attempt to maximize flatness for magnetic storage media such as computer hard disks, some manufacturers are considering glass substrates. Glass substrates' polishing processes first remove the damaged-micro-scratched layer produced in lapping. This damaged layer, caused by the aftermath of lapping, has a nominal depth of a few times the final abrasive's diameter used in its second or final stage lap or at least about 0.001" (0.025 mm) per side. For example, lapping with 7 $\mu$m particles requires a removal of about 20 $\mu$m per side for a total of about 40 $\mu$m. The polishing process must remove these damaged layers.

Cerium(IV) oxide slurries containing de-ionized water provide the bulk of the typical polish formulations for removing micro-scratched surfaces from computer disk glass substrates. For example, Chen et al., in U.S. Pat. No. 5,087,481, disclose using a "coarse" ceria slurry for polishing a glass disk. These ceria formulations also involve the chemical mechanism of $SiO_2$ catalysis to $Si(OH)_4$ or hydrolysis. The hydrolysis of the $SiO_2$ or glass dissolves the surface layer to remove the damaged surface. Furthermore, Lee M. Cook, in "Chemical Processes in Glass Polishing" discloses accelerated removal rate at pH 14 when polishing with silica particles. Typical removal rates for crystalline computer glass disks with ceria-based slurries range from 0.6 to 1 micron per minute at 1–2 pounds per square inch pad pressure (6.9 to 13.8 KPa). This removal rate typically varies with polishing temperature, polishing pad pressure, and polishing pad velocity.

Mechanical enhancements that increase the removal rate include: 1) increasing the polishing pressure; 2) using larger abrasive particles; and 3) polishing at higher pad velocities. Unfortunately, increasing the removal rate with these mechanical means has a negative impact on surface finish. Furthermore, for a high throughput process, the removal rate of the damaged surface must increase without any negative impact on surface finish.

Melard et al., in U.S. Pat. No. 4,601,755, disclose a slurry adapted for glass. The slurry uses ceria and a rare earth pyrosilicate having the formula $Ln_{2-x}Ce_xSi_2O_7$, wherein Ln is at least one lanthanide or yttrium and x is a number ranging from zero to less than 2.

Commercial operations require a two-step polish for achieving a surface roughness of Ra less than 5 Angstroms (AFM). The first-step polish removes the micro-scratched layer caused by lapping. The second-step polish removes surface scratches to smooth the glass surface. Manufacturers require slurries with consistent polishing performance to optimize performance of the first-step and second-step polish.

SUMMARY OF THE INVENTION

The polishing slurry includes by weight percent, 0.1 to 50 metal oxy-acid accelerator, 0.5 to 50 cerium oxide abrasive particles, 0.1 to 2 inorganic suspension agent and balance water. The metal oxy-acid accelerator is formed with a metal selected from the group consisting of chromium, lanthanum and rare earth metals 59 to 71, manganese, molybdenum, niobium, osmium, rhenium, ruthenium, titanium, tungsten, vanadium, yttrium and zirconium.

The method of polishing glass substrates includes the steps of contacting the glass substrate with polishing slurry having the above composition. Then polishing the glass substrate with a pad; and the slurry removes the glass surface from the glass substrate.

DETAILED DESCRIPTION OF THE INVENTION

Figure 1:
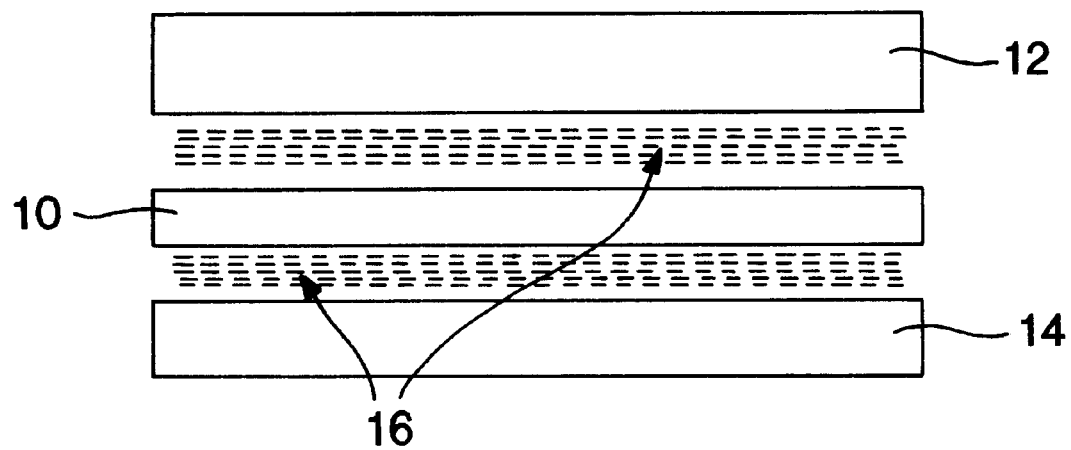
FIG. 1 is a schematic cross-sectional view of the interaction of the glass substrate, the polishing pads (top and bottom) and the polishing slurry.

It has been discovered that metal-oxy acids accelerate cerium oxide or ceria-base polishing slurries. In particular, a metal oxy-acid accelerator being an oxide of a metal selected from the group consisting of chromium, lanthanum and rare earth metals 59 to 71, manganese, molybdenum, niobium, osmium, rhenium, ruthenium, titanium, tungsten, vanadium, yttrium and zirconium increase polishing performance. These slurries facilitate glass removal and are particularly effective for glass computer disk substrates. These slurries contain cerium oxide abrasive particles, at least one metal oxy-acid accelerator and balance water. Most advantageously, the slurry contains de-ionized water.

The metal oxy-acids appear to provide a chemical mechanism for accelerating glass removal. Strong metal oxy-acid accelerators, such as those with a valence of at least (VI) provide the greatest impact. Metal oxy-acid accelerators believed to have the greatest impact include chromium(VI), manganese(VII), manganese(VI), molybdenum(VI), rhenium(VI) and tungsten(VI). Particular metal oxy-acids include: chromates, manganates, molybdates, permanganates and tungstates. Most advantageously, the metal oxy-acid accelerator is a tungstate. Acceptable tungstates include salts with ammonia, alkali metals and alkaline metals such as: ammonium tungstate, sodium tungstate, potassium tungstate, magnesium tungstate, calcium tungstate, strontium tungstate and barium tungstate.

An amount of about 0.1 to 50 weight percent metal oxy-acid accelerates the removal. Advantageously, the slurry contains about 0.2 to 20 weight percent metal oxy-acid accelerator. Most advantageously, it contains an amount of about 0.5 to 10 weight percent oxy-acid accelerator.

In particular, adding tungstate anions to an aqueous cerium oxide containing slurry accelerates removal rate and provides a superior surface finish. Ingredients of a slurry may include: cerium(IV) oxide, de-ionized water, slurry stabilizer, tungstate and a base such as potassium or sodium hydroxide for increasing pH of the slurry.

A nominal polishing composition embodying the invention is composed of a slurry formulated by suspending a polishing powder of cerium(IV) oxide powder in de-ionized water and adding the following:

1) Aluminum sulfate - 0.5–5% by weight
2) Tungstate —0.5–5% by weight
3) KOH —0–5% by volume, pH 11

This slurry nominally contained 10 weight percent cerium (IV) oxide having an average particle size of the powder of 1.5 μm (measured on the Coulter LS220) and maximum particle size of 10 micrometers and the surface area is approximately 3m$^2$/g.

Advantageously, the slurry contains a stabilizer for preventing agglomeration of the ceria. Most advantageously, the slurry contains a sulfate stabilizer, such as about 0.1 to 10 weight percent sulfate stabilizer. A particular example of an effective stabilizer is 0.1 to 5 weight percent aluminum sulfate.

The cerium oxide powder is contained at about 0.5 to 50 weight percent. Advantageously, the cerium oxide powder has a concentration of about 1 to 30 weight percent. Most advantageously, the cerium oxide has a concentration from about 2 to 25 weight percent. Furthermore, this cerium oxide is most advantageously a cerium(IV) oxide for polishing glass substrates. These polishing particles have an average size from about 0.001 to 20 μm. Advantageously, the ceria powder has an average size of about 0.1 to 10 μm. Most advantageously, the powder has an average size from about 0.2 to 7.5 μm. The surface area of the powder may range between about 0.01 and 10,000 m$^2$/g depending upon average particle size of the ceria.

The polishing may occur with an acidic, basic or neutral slurry. Advantageously, the polishing occurs at a pH of at least about 7. A higher pH, such as a pH of at least about 9 further increases the removal rate. Most advantageously, the slurry has a pH of at least about 10 to further accelerate the removal process. Any caustic agent such as, ammonium hydroxide, potassium hydroxide or sodium hydroxide will raise the slurry's pH to a level that provides an additional strength to the slurry's removal rate performance.

Referring to FIG. 1, polishing glass disk 10 involves pressing top polishing pad 12 and lower polishing pad 14 against the disk 10. The pads 12 and 14 rotate in opposite directions with a polishing slurry 16 dispensed on the pads 12 and 14. The slurry 16 travels downwardly through openings (not illustrated) in top pad 12. After polishing, the slurry exits through similar openings through lower polishing pad 14 and exits through side openings between the disk 10 and polishing pads 12 and 14.

EXAMPLE 1

The glass disks are placed in the set-up shown in FIG. 1. The polishing process parameters used for the following Examples were as follows:

TABLE 1

| Polisher | Hamai 16BF |
| --- | --- |
| Pad | Urethane |
| Polish time | 10 minutes |
| Polish Pressure | 1.5 psi (10.3 KPa) |
| Lower Platen Speed | 35 rpm |
| Upper Platen Speed | 12 rpm |
| Flow-rate | 350–400 ml/min |
| Glass substrate | Crystalline disks |

A group of comparative polishing compositions and polishing compositions embodying the invention were prepared in the form of slurries, each formulated by suspending cerium(IV) oxide in de-ionized water and adding the chemicals as shown in Table 2 below:

TABLE 2

| Comparative Slurry A | Comparative Slurry B | Slurry 1 | Slurry 2 | Slurry 3 | Slurry 4 |
| --- | --- | --- | --- | --- | --- |
| Cerium (IV) Oxide - 10% pH - 8 | Cerium (IV) Oxide - 10% KOH added to adjust pH to 11 | Cerium (IV) Oxide - 10% Aluminum Sulfate - 0.16% by wt. Sodium Tungstate - 0.5% KOH added to adjust pH to 11 | Cerium (IV) Oxide - 10% Aluminum Sulfate - 0.16% by wt. Sodium Tungstate - 0.11% by wt. KOH added to adjust pH to 11 | Cerium (IV) Oxide - 10% Aluminum Sulfate - 0.16% by wt. Sodium Tungstate - 0.5% KOH added to adjust pH to 8 | Cerium (IV) Oxide - 10% Aluminum Sulfate - 0.16% by wt. Potassium Molybdate - 0.5% KOH added to adjust pH to 11 |

After polishing with the above 6 slurries, the glass substrates were analyzed for any surface defects under an AFM microscope and the pre-polished and post-polished weight of the disks were measured to calculate the removal rate. The test results are shown in Table 3 below.

TABLE 3

| | Removal rate (micro-inches/min) | Removal rate (μm/min) |
| --- | --- | --- |
| Slurry A | 26.37 | 0.660 |
| Slurry B | 28.25 | 0.706 |
| Slurry 1 | 31.38 | 0.784 |
| Slurry 2 | 28.35 | 0.709 |
| Slurry 3 | 28.41 | 0.710 |
| Slurry 4 | 29.56 | 0.739 |

Figure 2:
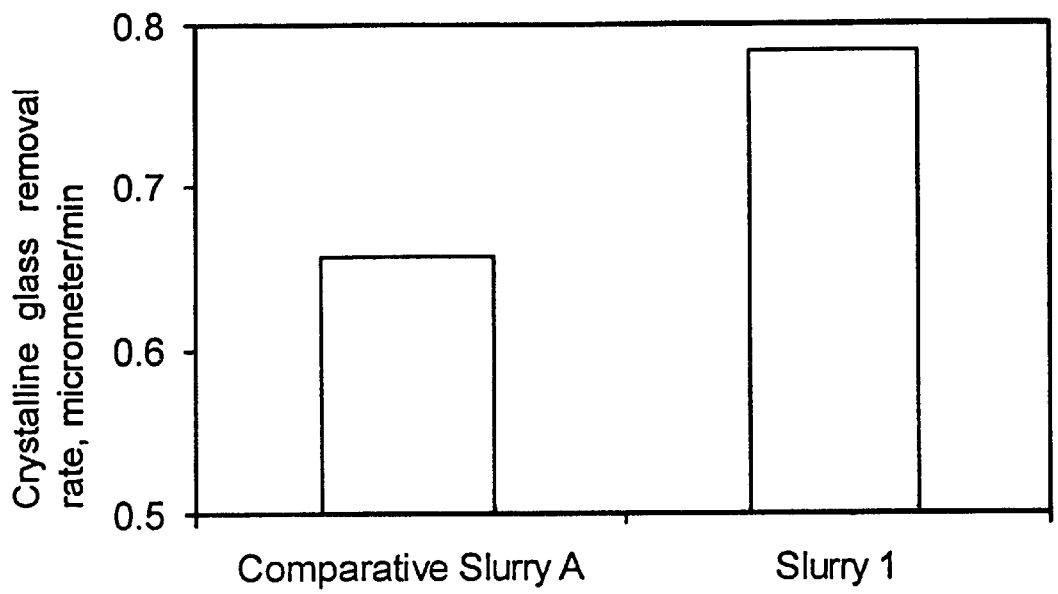
FIG. 2 is a bar graph illustrating the difference in removal rate for polishing a crystalline glass substrate with a slurry of cerium(IV) oxide and de-ionized water in comparison to a slurry containing a metal oxy-acid accelerator agent of the invention.

As seen from Table 3 above, Polishing Slurry 1 provides the highest removal rate. Furthermore, increasing tungstate concentration increases the removal rate. These data also establish that increasing pH increases removal rate. Furthermore they establish that both molybdate and tungstate provide effective accelerators for polishing glass substrates. FIG. 2 illustrates that the removal rate achieved with this formulation is 1.2 times the "conventional removal rate".

Table 4 illustrates the lower surface roughness (Ra) achieved with the tungstate-containing polishing slurry that improves results over Comparative Slurry A.

TABLE 4

| | Roughness, Ra* (Angstroms) |
| --- | --- |
| Slurry A | 9.83 |
| Slurry 1 | 5.28 |

Figure 3:
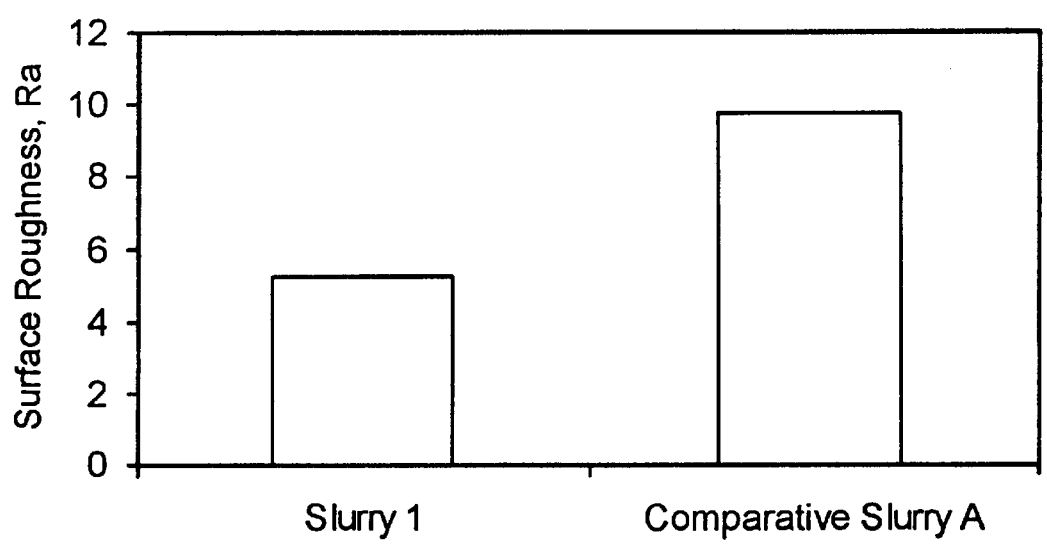
FIG. 3 is a bar graph illustrating the difference in surface roughness for polishing a crystalline glass substrate with a slurry of cerium(IV) oxide and de-ionized water in comparison to a slurry containing a metal oxy-acid accelerator agent of the invention.

FIG. 3 shows that the surface roughness, Ra is 0.5 times the Ra of conventional cerium(IV) oxide powder and water formulations.

The polishing slurry facilitates rapid removal of scratched surfaces from glass substrates, such as the scratched surface of a glass computer disk. It is particularly effective at removing scratched glass surfaces having a thickness of at least 10 μm. The metal oxy-acid-containing slurry is also particularly effective for glass memory disk substrates as a first and second step polish slurry. For typical polishing, this slurry reduces first-step polishing time to remove 40 micrometers for glass disk substrates from about sixty one minutes per run to about fifty one minutes per run for first step polish. Furthermore, the metal oxy-acid-containing slurries have smoother surface finishes for the first-step polish. The slurry compositions facilitate polishing memory hard disks at higher removal rates with a superior surface finish.

Although this invention disclosure presents only the selected examples of slurry compositions for polishing glass, it should be apparent to those skilled in the art that any slurry composition that satisfies the above characteristics will be applicable for the described application.

What is claimed is:

1. A polishing slurry comprising, by weight percent, about 0.1 to 50 metal oxy-acid accelerator, the metal oxy-acid accelerator being a tungstate; about 0.5 to 50 cerium oxide abrasive particles; and a balance water.

2. A polishing slurry comprising, by weight percent, about 0.2 to 20 metal oxy-acid accelerator, the metal oxy-acid accelerator being a tungstate; about 1 to 30 cerium oxide abrasive particles; and a balance water, wherein the polishing slurry has a pH of at least 7.

3. A polishing slurry for polishing glass computer disks comprising, by weight percent, about 0.5 to 10 metal oxy-acid accelerator, the metal oxy-acid accelerator being a tungstate; about 2 to 25 cerium (IV) oxide abrasive particles, the particles having an average size of about 0.001 to 20 $\mu$m; and a balance water, wherein the polishing slurry has a pH of at least 9.

4. The polishing slurry of claim 3 including about 0.1 to 10 weight percent of a sulfate stabilizer.

5. The polishing slurry of claim 3 wherein the cerium (IV) oxide abrasive particles have an average particle size of about 0.1 to 10 $\mu$m.

6. The polishing slurry of claim 3 wherein the cerium (IV) oxide abrasive particles have an average particle size of about 0.2 to 7.5 $\mu$m.

7. The polishing slurry of claim 6 wherein the polishing slurry has a pH of at least 10.

* * * * *